United States Patent [19]
Otsuka

[11] Patent Number: 5,059,162
[45] Date of Patent: Oct. 22, 1991

[54] PLANETARY GEAR SYSTEM

[75] Inventor: Kunio Otsuka, Ebina, Japan

[73] Assignee: Nissan Motor Co., Ltd., Yokohama, Japan

[21] Appl. No.: 587,808

[22] Filed: Sep. 25, 1990

[30] Foreign Application Priority Data

Oct. 3, 1989 [JP] Japan .................................. 1-258287

[51] Int. Cl.⁵ .............................................. F16H 3/62
[52] U.S. Cl. ..................................... 475/276; 475/330
[58] Field of Search ............... 475/330, 329, 276, 204, 475/205, 206

[56] References Cited

U.S. PATENT DOCUMENTS

| | | | |
|---|---|---|---|
| 2,220,174 | 11/1940 | Ravigneaux | 74/268 |
| 2,631,476 | 3/1953 | Ravigneaux | 74/759 |
| 2,761,333 | 9/1956 | Ravigneaux | 74/759 |
| 2,847,877 | 8/1958 | Ravigneaux | 74/759 |
| 2,873,625 | 2/1959 | Simpson | 74/76 |
| 3,299,746 | 1/1967 | Konrad | 74/758 |
| 3,853,023 | 12/1974 | Mori et al. | 74/759 |
| 3,979,974 | 9/1976 | Murakami | 74/759 |
| 3,987,690 | 10/1976 | Murakami et al. | 475/276 |
| 4,089,238 | 5/1978 | Forster et al. | 475/276 |
| 4,304,152 | 12/1981 | Michling | 475/330 |
| 4,334,440 | 6/1982 | Fonck | 475/330 |
| 4,417,484 | 11/1983 | Gaus et al. | 74/688 |
| 4,635,347 | 3/1987 | Hiraiwa | 74/759 |
| 4,638,688 | 1/1987 | Hiraiwa | 74/763 |
| 4,653,348 | 3/1987 | Hiraiwa | 74/759 |
| 4,660,439 | 4/1987 | Hiraiwa | 74/763 |
| 4,802,385 | 2/1989 | Hiraiwa | 74/758 |

FOREIGN PATENT DOCUMENTS

| | | |
|---|---|---|
| 50-64660 | 5/1975 | Japan . |
| 62149562 | 12/1977 | Japan . |
| 61-117950 | 7/1986 | Japan . |
| 61-502274 | 10/1986 | Japan . |
| 62-83541 | 4/1987 | Japan . |
| 62-155356 | 7/1987 | Japan . |
| 63-47542 | 2/1988 | Japan . |
| 63-88353 | 4/1988 | Japan . |

Primary Examiner—Dirk Wright
Attorney, Agent, or Firm—Foley & Lardner

[57] ABSTRACT

A planetary gear system includes a main planetary gear train including first and second planetary gear sets coaxial with an input shaft, and a secondary planetary gear train including a third planetary gear set coaxial with an output shaft. Each gear set has three rotary active elements, a sun gear, a ring gear and a planet carrier. Among six rotary active elements of the first and second gear sets, one active element of the first gear set is connected with one active element of the second gear set, and another active element of the first gear set is connected with another active element of the second gear set so that each connected element pair rotates as a unit. Furthermore, the third gear set is combined with the main gear train in such a compound manner that rotations of two different active elements of the third gear set are restricted, respectively by two different active elements of the main gear train.

21 Claims, 4 Drawing Sheets

FIG.2A

| DEVICE / SPEED | C1 | C2 | C3 | B1 | B2 | B3 |
|---|---|---|---|---|---|---|
| 1ST | ○ |  |  | ○ |  |  |
| 2ND | ○ |  |  |  | ○ |  |
| 3RD | ○ |  |  |  |  | ○ |
| 4TH | ○ | ○ |  |  |  |  |
| 5TH |  | ○ |  |  |  | ○ |
| REV |  |  | ○ | ○ |  |  |

FIG. 2B

|  | NUMBER OF RING GEAR TEETH | NUMBER OF SUN GEAR TEETH | RATIO |
|---|---|---|---|
| FIRST PLANETARY GEAR SET | 75 | 33 | 0.440 |
| SECOND PLANETARY GEAR SET | 75 | 42 | 0.560 |
| THIRD PLANETARY GEAR SET | 75 | 35 | 0.467 |

FIG. 2C

| SPEED | GEAR RATIO |
|---|---|
| FIRST | 2.785 |
| SECOND | 1.952 |
| THIRD | 1.545 |
| FOURTH | 1.000 |
| FIFTH | 0.694 |
| REVERSE | 2.272 |

PLANETARY GEAR SYSTEM

BACKGROUND OF THE INVENTION

The present invention relates to planetary gear systems for automatic transmissions, especially of a type having three planetary gear sets.

Japanese patent provisional publication No. 62-83541 discloses a conventional planetary gear system for providing five or more forward speeds. This planetary gear system has a main planetary gear train composed of two planetary gear sets for providing four forward speeds, and a secondary planetary gear train which is composed of one planetary gear set, and which is connected in series with the main planetary gear train.

Japanese patent provisional publication No. 63-47542 discloses a planetary gear system for a transaxle of an F.F. vehicle. This planetary gear system has a main planetary gear train coaxial with an input shaft, and a secondary planetary gear train coaxial with an output shaft which is parallel to the input shaft. The input and output shafts are connected by gearing.

However, the latter system requires two friction devices for the secondary planetary gear train in addition to five friction devices for the main planetary gear train, so that the number of the required friction devices is relatively great.

Furthermore, the gear ratio finally obtained by the gear arrangement in which the main planetary gear train is connected in series with the secondary planetary gear train, is determined by a product between the gear ratio of the main planetary gear train and the gear ratio of the secondary gear train. Therefore, the gear ratios of the conventional gear system tend to be too high or too low, and it is difficult to set the gear ratios of all the forward speeds equal to the optimum values.

The conventional gear systems are so arranged that the main and secondary gear trains are shifted independently. Therefore, these systems require a complicated control unit for controlling the friction devices in order to reduce a shift shock, especially to reduce a shift shock when both planetary gear trains are shifted simultaneously.

Japanese patent provisional publication No. 62-155356 discloses another conventional planetary gear system for F.F. vehicles. This conventional gear system is composed of one planetary gear set and a plurality of pairs of mating gears of a parallel shaft type. However, the parallel shaft type gears of this conventional system increases the size of the transmission. Some of the friction devices must have a sufficiently great torque capacity to endure torque of a considerable magnitude. Furthermore, some clutches are arranged in series with the parallel shaft type gears, so that the size of the system is increased. The controllability of this conventional gear system is relatively poor because some clutches are switched while they are rotating.

SUMMARY OF THE INVENTION

It is an object of the present invention to provide a planetary gear system having at least three planetary gear sets which are combined in such a sophisticated manner as to provide desired gear ratios, to facilitate the shift control, and to reduce the size of the gear system.

A planetary gear system according to the present invention comprises an input means for receiving an input rotation, an output means for delivering an output rotation, first and second planetary gear trains, and first and second connecting means. The first (or main) planetary gear train comprises first and second planetary gear sets, and is connected with the input means. The second (or secondary) planetary gear train comprises a third planetary gear set, and is connected with the output means. The first connecting means connects the first planetary gear train with the second planetary gear train. The second connecting means further connects the first planetary gear train with the second planetary gear train.

In illustrated embodiments of the invention, each of the first, second and third planetary gear sets comprises three rotary active elements which are sun gear, ring gear and planet carrier. The first and second planetary gear sets are of a single pinion type in which a single pinion is in direct engagement with the sun and ring gears. The third planetary gear set is of a double pinion type in which an inner pinion is in direct engagement with the sun gear, and an outer pinion is in direct engagement with both the inner pinion and the ring gear. The planet carrier of the first planetary gear set is connected with the ring gear of the second planetary gear set so that they rotate as a unit. The planet carrier of the second planetary gear set is connected with the ring gear of the first planetary gear set so that they rotate as a unit. The first connecting means connects the planet carrier of the first planetary gear set with the sun gear of the third planetary gear set by gearing or in such a manner that both elements rotate as a unit. The second connecting means connects the ring gear of the first planetary gear set with the ring gear of the third planetary gear set by gearing or in such a manner that both ring gears rotate as a unit.

The planetary gear system of the invention may further comprises a friction device group comprising friction devices such as clutches and brakes.

BRIEF DESCRIPTION OF THE DRAWINGS

FIG. 2A is a table showing the operating states of friction devices of the planetary gear system of the first embodiment.

FIG. 2B is a table showing gear sizes employed in the gear system of the first embodiment.

FIG. 2C is a table showing the gear ratio value of each speed obtained by the gear system of the first embodiment.

DETAILED DESCRIPTION OF THE INVENTION

Figure 1:
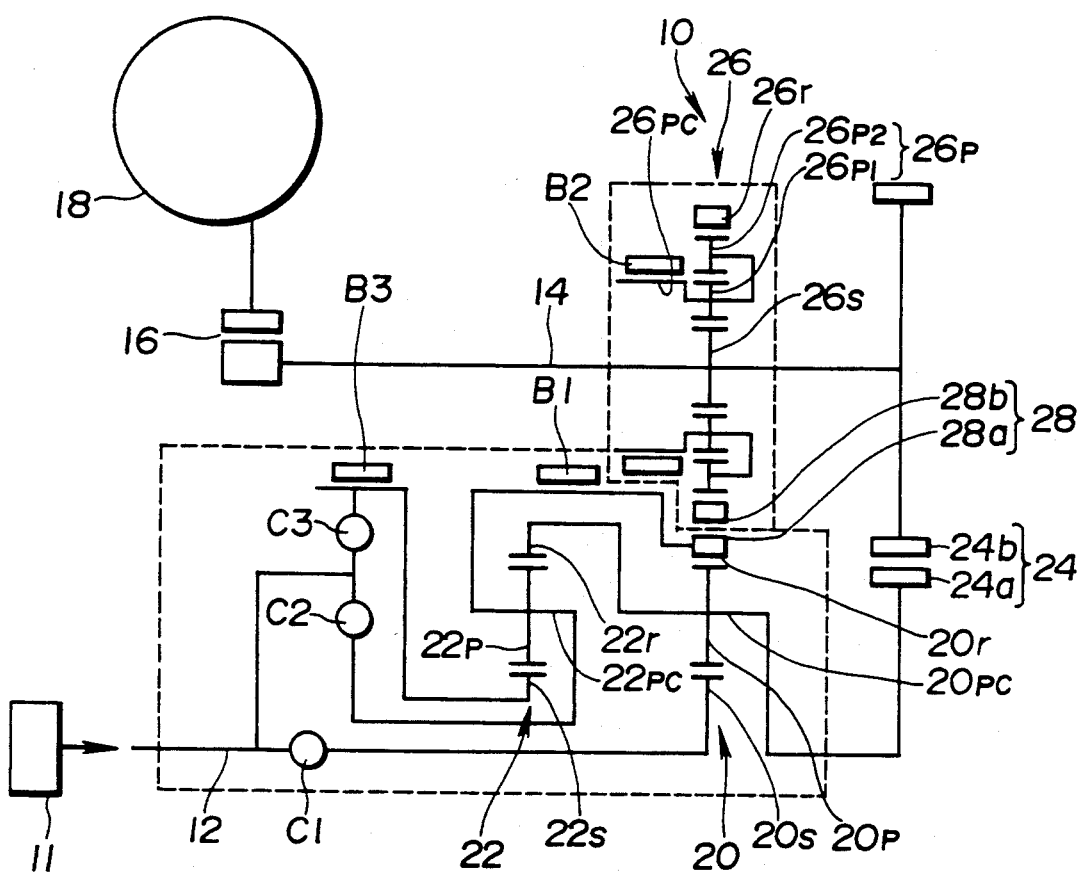
FIG. 1 is a schematic view (skeleton diagram) of a planetary gear system according to a first embodiment of the invention.

A first embodiment of the present invention is shown in FIGS. 1 and 2A–2C. A planetary gear system 10 of the first embodiment is a component part of an automatic transmission of an F.F. vehicle.

The planetary gear system 10 of the first embodiment includes an input means for receiving an input rotation from a torque converter 11 which is connected with an engine of the vehicle, and an output means for outputting an output rotation. The input means comprises an input shaft 12, and the output means comprises an output shaft 14. In this embodiment, the input and output shafts 12 and 14 are arranged in parallel to each other.

An engine torque of the engine is transmitted through the torque converter 11 disposed on the left side of the planetary gear system as viewed in FIG. 1, to the input shaft 12. The output rotation of the planetary gear system 10 is delivered from the output shaft 14 through a final gear 16 to a differential gear 18. The left end of the output shaft 14 is connected with the final gear 16, as shown in FIG. 1.

The planetary gear system 10 further includes a first (or main) planetary gear train and a second (or secondary) planetary gear train. In this embodiment, the first planetary gear train consists of a first planetary gear set 20 and a second planetary gear set 22, and the second planetary gear train consists of a third planetary gear set 26.

The first planetary gear set 20 includes a first sun gear 20s, a first ring gear 20r, and a first planet carrier 20pc. These three elements are rotary active elements of the first planetary gear set 20. The first planetary gear set 20 is a single pinion type planetary gear set(or a simple planetary arrangement). In this embodiment, the first planet carrier 20pc rotatably supports at least one first pinion 20p which is in direct engagement with both the first sun gear 20s and the first ring gear 20r. The first planetary gear set 20 is coaxial with the input shaft 12.

The second planetary gear set 22 includes a second sun gear 22s, a second ring gear 22r, and a second planet carrier 22pc. These three elements are rotary active elements of the second planetary gear set 22. The second planetary gear set 22 is also of the single pinion type. In this embodiment, at least one second pinion 22p is rotatably supported on the second planet carrier 22pc. The second pinion 22p is in direct mesh with both the second sun gear 22s and the second ring gear 22r. The second planetary gear set 22 is also coaxial with the input shaft 12. The second planetary gear set 22 is disposed on the left side of the first planetary gear set 20, as viewed in FIG. 1.

The third planetary gear set 26 includes a third sun gear 26s, a third ring gear 26r and a third planet carrier 26pc, which are three active elements of the third planetary gear set 26. The third planetary gear set 26 is a double pinion type planetary gear set (a dual planetary arrangement). In this embodiment, the third planet carrier 26pc rotatably supports one or more pinion groups each of which includes a third inner pinion 26p1 and a third outer pinion 26p2. In the pinion group or each of the pinion groups, the third inner pinion 26p1 is in direct mesh with both the third sun gear 26s and the third outer pinion 26p2, and the third outer pinion 26p2 is in direct mesh with both the third inner pinion 26p1 and the third ring gear 26r. Therefore, rotation can be transmitted from the third sun gear 26s to the third ring gear 26r in such a manner that the rotational direction of the third ring gear 26r is the same as the rotational direction of the third sun gear 26s. The third planetary gear set 26 is mounted on the output shaft 14 so that the third planetary gear set 26 is coaxial with the output shaft 14. The third planetary gear set 26 is disposed at an axial position corresponding to the axial position of the first planetary gear set 20.

The planetary gear system further includes a friction device group which, in this embodiment, includes six friction devices. The friction devices of this embodiment are first, second and third clutches C1, C2 and C3, and first, second and third band brakes B1, B2 and B3. The first clutch C1 is disposed between the input shaft 12 and the first sun gear 20s. The first clutch C1 can connect the first sun gear 20s with the input shaft 12, and disconnect the first sun gear 20s from the input shaft 12. The first band brake B1 is disposed between a stationary housing (transmission case) and the first ring gear 20r. The first band brake B1 can hold or ground the first ring gear 20r.

The second sun gear 22s is connected to the input shaft 12 through the third clutch C3, and further connected to the stationary housing through the third band brake B3. The third clutch C3 can connect the second sun gear 22s with the input shaft 12, and the third brake B3 can hold the second sun gear 22s. The second planet carrier 22pc is connected to the input shaft 12 through the second clutch C2. The second clutch C2 can make a driving connection between the input shaft 12 and the second planet carrier 22pc. The second band brake B2 is disposed between the stationary housing and the third planet carrier 26pc, so that the second brake B2 can hold the third planet carrier 26pc. A shift control unit is connected with the friction devices C1-C3 and B1-B3. The shift control unit controls each friction device as shown in FIG. 2A.

The planetary gear system of this embodiment further includes first and second connecting means each of which connects one active element of the first and second planetary gear sets 20 and 22 with one active element of the third planetary gear set 26, and third and fourth connecting means each of which connects one active element of the first planetary gear set 20 with one active element of the second planetary gear set 22. In this embodiment, the first ring gear 20r and the second planet carrier 22pc are connected together by the third connecting means, and the second ring gear 22r and the first planet carrier 20pc are connected together by the fourth connecting means. The first ring gear 20r and the second planet carrier 22pc constitute a single rotary member, and they rotate as a unit. The second ring gear 22r and the first planet carrier 20pc constitute another single rotary member, and they rotate as a unit. Thus, the first planetary gear train consisting of the first and second planetary gear sets 20 and 22 has four rotary members which are rotatable relative to one another. Two of the four rotary members are two-element members each consisting of two active elements. The remaining two of the four rotary members are single element members each of which consists of only one active element. The first two-element member is composed of the first ring gear 20r and the second planet carrier 22pc, and the second two-element member is composed of the second ring gear 22r and the first planet carrier 20pc. The first sun gear 20s forms the first single element member, and the second sun gear 22s forms the second single element member.

In this embodiment, each of the first and second connecting means includes a gearing means for connecting, by gearing, one active element coaxial with the input shaft 12 with one active element coaxial with the output shaft 14 which is parallel to the input shaft 12. The first connecting means comprises a pair 24 of a first primary gear (first input shaft's side gear) 24a and a first counter gear (first output shaft's side gear) 24b. The second connecting means comprises a pair 28 of a second primary gear (second input shaft's side gear) 28a and a second counter gear (second output shaft's side gear) 28b. The first and second primary gears 24a and 28a are coaxial with the input shaft 12, and the first and second counter gears 24b and 28b are coaxial with the output shaft 14. The primary and counter gears of each of the first and second connecting means are gears of a parallel shaft type which can transmit rotation between two parallel shafts. In each pair 24 or 28, the primary gear is in mesh with the counter gear.

The first primary gear 24a is connected with the first planet carrier 20pc. Therefore, the first planet carrier 20pc, the second ring gear 22r and the first primary gear 24a rotate as a unit. The first counter gear 24b is mounted on the right end of the output shaft 14. The third sun gear 26s and the first counter gear 24b are connected with the output shaft 14 in such a manner that the first counter gear 24b, the third sun gear 26s and the output shaft 14 rotate as a unit. Therefore, the first connecting means connects the first planet carrier 20pc with the third sun gear 26 in such a manner that rotation can be transmitted therebetween.

In this embodiment, the second primary gear 28a is formed on the outer periphery of the first ring gear 20r, and the second counter gear 28b is formed on the outer periphery of the third ring gear 26r. Therefore, the second primary gear 28a is an integral part of the first ring gear 20r, and the second counter gear 28b is an integral part of the third ring gear 26r. Each of the first and third ring gears is formed with internal gear teeth and external gear teeth. Thus, the second pair 28 of the primary and counter gears connects the first ring gear 20r and the third ring gear 26r in such a manner that rotation can be transmitted therebetween.

The planetary gear system has first and second ends which are spaced axially along an axial direction parallel to the input and output shafts 12 and 14. In FIG. 1, the first end is the left end, and the second end is the right end. The first primary and counter gears 24a and 24b are located at the second end of the planetary gear system. The second planetary gear set 22 is disposed axially between the first (left) end of the gear system and the first planetary gear set 20. The first planetary gear set 20 is disposed axially between the second planetary gear set 22 and the first primary gear 24a. The first and second planetary gear sets 20 and 22 are disposed between the first end of the planetary gear system and the first primary gear 24a. The first planetary gear set 20 is disposed axially between the input shaft 12 and the first primary gear 24a.

The planetary gear system 10 of this embodiment can provide five forward speeds and one reverse speed. In each speed, two of the friction devices are engaged as shown by small circles in the table shown in FIG. 2A. In the first speed, the friction devices in the engaged state are the first clutch C1 and the first brake B1. The first clutch C1 transmits the input rotation of the input shaft 12 to the first sun gear 20s, and the first brake B1 holds the first ring gear 20r stationary. In the first planetary gear set, therefore, the first ring gear 20r functions as a held element. The first sun gear 20s functions as an input driving element, and the first planet carrier 20pc functions as an output driven element for forward reduction. Then, the first pair 24 of the parallel shaft type gears transmits the rotation of the first planet carrier 20pc to the output shaft 14.

The planetary gear system achieves the shift from the first speed to the second speed by disengaging the first brake B1 and instead engaging the second brake B2. The first brake B1 releases the first ring gear 20r, and instead the second brake B2 holds the third planet carrier 26pc stationary. Therefore, rotation of the output shaft 14 is transmitted through the third sun gear 16s and the third pinions 26p1 and 26p2 to the third ring gear 26r, and rotation of the third ring gear 26r is transmitted to the first ring gear 20r through the second pair 28 of the primary and counter gears. In this case, the third ring gear 26r rotates in the same direction as the third sun gear 26s because the third planetary gear set 26 is of the double pinion type. Therefore, the third ring gear 26r causes the first ring gear 20r to rotate in the rotational direction of the first planet carrier 20pc. As a result, the first planet carrier 20pc rotates faster than in the first speed.

The planetary gear system 10 provides the third speed by engaging the first clutch C1 and the third brake B3. The third brake B3 holds the second sun gear 22s stationary. Therefore, rotation of the first planet carrier 20pc is transmitted through the second ring gear 22r to the second planet carrier 22pc, and the first ring gear 20r rotates together with the second planet carrier 22pc in the same direction as the first planet carrier 20pc. The planetary gear system 10 is so designed that the rotational speed of the first ring gear 20r is higher in the third speed than in the second speed. Therefore, the upshift from the second speed to the third speed results in an increase of the speed of the first planet carrier 20pc.

The planetary gear system 10 provides the fourth forward speed by engaging the first clutch C1 and the second clutch C2. The second clutch C2 connects the second planet carrier 22pc with the input shaft 12, so that the input rotation is transmitted to the first ring gear 20r. Therefore, the first ring gear 20r and the first sun gear 20s rotate at the same speed in the same direction. As a result, the first planet carrier 20pc rotates at the input speed of the input shaft 12.

The fifth forward speed is obtained by engaging the second clutch C2 and the third brake B3. The third brake B3 holds the second sun gear 22s, and the second clutch C2 transits the input rotation of the input shaft 12 to the second planet carrier 22pc. Therefore, the second ring gear 22r rotates at a speed higher than the input speed together with the first planet carrier 20pc.

The planetary gear system 10 provide the reverse speed by engaging the third clutch C3 and the first brake B1. The first brake B1 holds the second planet carrier 22pc, and the third clutch C3 transmits the input rotation from the input shaft 12 to the second sun gear 22s. Therefore, the second ring gear 22r is driven in the opposite direction at a reduced speed together with the first planet carrier 20pc.

FIG. 2B shows the gear sizes of the first, second and third planetary gear sets 20, 22 and 26 of this embodiment. The numbers of teeth of the ring gears of the first, second and third planetary gear sets 20, 22 and 26 are equal to each other. The number of teeth of the sun gear of the third planetary gear set 26 is greater than that of the first planetary gear set 20, and smaller than that of the second planetary gear set 22. The ratio of the number of sun gear teeth to the number of ring gear teeth of the third planetary gear set 26 is greater than that of the first planetary gear set 20, and smaller than that of the second planetary gear set 22. FIG. 2C shows the gear ratio of each speed obtained by the planetary gear system 10 of this embodiment.

In the thus-constructed planetary gear system 10, the third planetary gear set 26 is combined with the first and second planetary gear sets 20 and 22 in a compound manner. This compound combination makes it possible to choose the gear ratio of each speed more freely from values in a wider range, as compared with the conventional series combination of the main planetary gear train on the input shaft's side, and the third planetary gear set which is arranged to receive the output rotation of the main gear train and to change the speed ratio again on the output shaft's side.

The compound combination of the first, second and third planetary gear sets 20, 22 and 26 according to the present invention makes it possible to reduce the number of required friction devices. The third planetary gear set 26 of the invention requires only one friction device (B2) for allowing and preventing transmission of rotation from the output shaft 14 to the third ring gear 26r.

The planetary gear system 10 of this embodiment provides each forward speed by engaging two of the friction devices, and performs each shift between two successive forward speeds by holding one device invariably in the engaged state. As shown in FIG. 2A, the first clutch C1 remains constantly engaged from the first speed to the fourth speed, and the second clutch C2 remains engaged between the fourth and fifth speeds. The upshift or downshift from each forward speed to the next speed is effected by disengaging one device and instead engaging another device. Therefore, the planetary gear system of this embodiment can improve the quality of shifting, facilitate the shift control, and simplify the construction of the shift control unit.

In this embodiment, the first, second and third clutches C1, C2 and C3 and the third brake B3 are arranged in such a coaxial manner that one encircles another. Furthermore, the first brake B1 is arranged coaxially around the second planetary gear set 22. Therefore, it is possible to reduce the axial length of the planetary gear system considerably. The planetary gear system is superior especially when used for a transaxle of a front engine front wheel drive automobile. In this embodiment, the second planetary gear set 22 and the first brake B1 are disposed axially between the first planetary gear set 20 and the coaxial arrangement of the friction devices C1, C2, C3 and B3.

Figure 3:
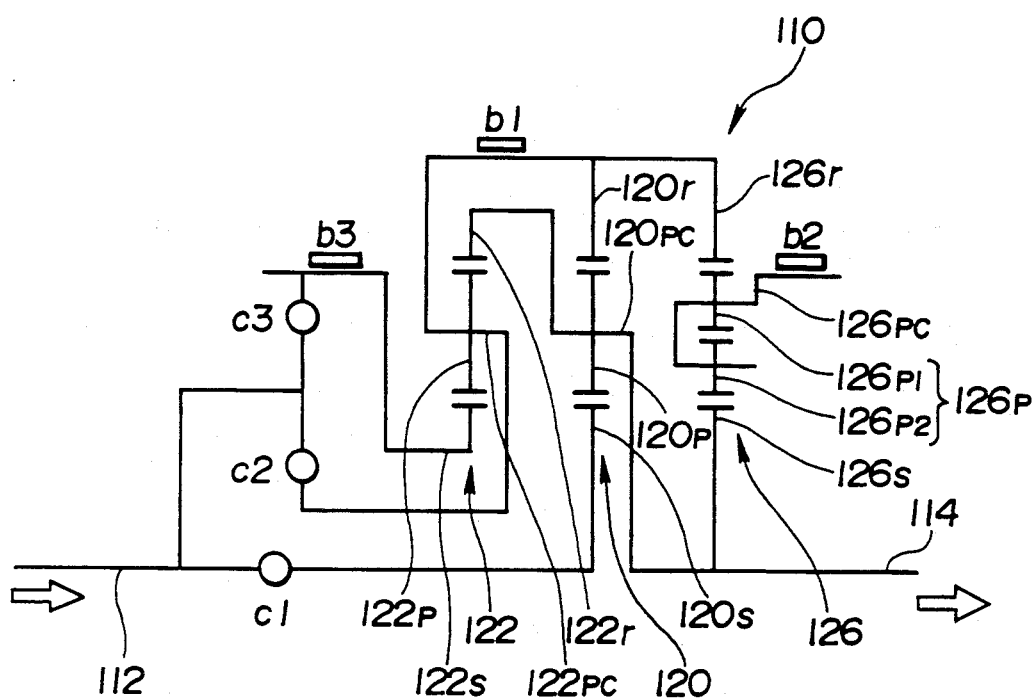
FIG. 3 is a schematic view of a planetary gear system according to a second embodiment of the invention.

A second embodiment of the present invention is shown in FIG. 3. A planetary gear system 110 of the second embodiment is used for an automatic transmission of an F.R. vehicle.

In the second embodiment, input and output shafts 112 and 114 are aligned in a straight line. First, second and third planetary gear sets 120, 122 and 126 are all arranged around the above-mentioned straight line which serves as a common axis. The first planetary gear set 120 is placed axially between the second and third planetary gear sets 122 and 126. The first and second planetary gear sets 120 and 122 are of the single pinion type, and the third planetary gear set 126 is of the double pinion type, as in the first embodiment. The first planet carrier 120pc of the first planetary gear set 120 is connected with the second ring gear 122r so that they rotate as a unit. The first planet carrier 120pc is further connected with the third ring gear 126s of the third planetary gear set 126 so that they rotate as a unit. The third sun gear 126s is connected with the output shaft 114 so that they rotate as a unit. The second planet carrier 122pc is connected with the first ring gear 120r so that they rotate as a unit. The first ring gear 120r is connected with the third ring gear 126r of the third planetary gear set 126 so that they rotate as a unit.

The input shaft 112 is connected to the first sun gear 120s through a first clutch c1, to the second planet carrier 122pc through a second clutch c2, and to the second sun gear 122s through a third clutch c3. The transmission case (housing) is connected to the first ring gear 120r through a first brake b1, to the third planet carrier 126pc through a second brake b2, and to the second sun gear 122s through a third brake b3.

As explained above, the compound combination of three planetary gear sets according to the present invention can reduce shift shock because the three reduce the axial dimension of the planetary gear system, reduce the number of friction devices, and permit a wide choice of gear ratio values. Especially, the final output speed is determined by the first planet carrier. Therefore, it is possible to set the final speed ratio of each speed freely, as compared with the conventional arrangement in which the final speed ratio is equal to the product obtained by multiplying the speed ratio of the first gear train on the input shaft's side, by the speed ratio of the gear train on the output shaft's side.

What is claimed is:

1. A planetary gear system comprising:
   an input means for receiving an input rotation;
   an output means for delivering an output rotation;
   a first planetary gear train comprising first and second planetary gear sets, said first planetary gear train being connected with said input means;
   a second planetary gear train comprising a third planetary gear set, said second planetary gear train being connected with said output means;
   a first connecting means for connecting said first planetary gear train with said second planetary gear train;
   a second connecting means for connecting said first planetary gear train with said second planetary gear train;
   a third connecting means for connecting one rotary element of said first planetary gear set with one rotary element of said second planetary gear set, and a fourth connecting means for connecting another rotary element of said first planetary gear set with another rotary element of said second planetary gear set;
   wherein said first connecting means drivingly connects one rotary element of said first planetary gear train with one rotary element of said third planetary gear set, and said second connecting means drivingly connects another rotary element of said first planetary gear train with another rotary element of said third planetary gear set; and
   wherein said input means comprises an input shaft, said output means comprises an output shaft, and said input and output shafts are arranged in parallel to each other, and wherein said first connecting means comprises a first pair of mating gears of a parallel shaft type for transmitting rotation between two parallel shafts, and said second connecting means comprises a second pair of mating gears of said parallel shaft type.

2. A planetary gear system according to claim 1 wherein said planetary gear system has first and second ends which are axially spaced along an axial direction parallel to said input and output shafts, said first connecting means being provided at said second end of said planetary gear system so that said first, second and third planetary gear sets are placed axially between said first pair of mating gears, and said first end of said planetary gear system.

3. A planetary gear system according to claim 1 wherein each of said first, second and third planetary gear sets comprises three rotary active elements each of which functions as a unique one of sun gear, ring gear and planet carrier, said first planetary gear train comprises four rotary members each of which is rotatable relative to one another, two of said four rotary members being two-element members, and the remaining two of said four rotary members being one-element members, each of said two-element members comprising two of said active elements of said first and second planetary gear sets, each of said one-element members comprising one of said active elements of said first and second planetary gear sets, said first connecting means connecting a first one of said four rotary members of said first planetary gear train with a first one of said active elements of said third planetary gear set in such a manner that rotation can be transmitted therebetween, said second connecting means connecting a second one of said four rotary members of said first planetary gear train with a second one of said active elements of said third planetary gear set in such a manner that rotation can be transmitted therebetween.

4. A planetary gear system according to claim 1 wherein each of said first, second and third planetary gear sets comprises three rotary active elements each of which functions as a unique one of sun gear, ring gear and planet carrier, said first connecting means connecting one of said active elements of said first and second planetary gear sets with one of said third planetary gear set, said second connecting means connecting another of said active elements of said first and second planetary gear sets with another of said active elements of said third planetary gear set, and wherein said planetary gear system further comprises a third connecting means for connecting one of said active elements of said first planetary gear set with one of said active elements of said second planetary gear set, and a fourth connecting means for connecting another of said active elements of said first planetary gear set with another of said active elements of said second planetary gear set.

5. A planetary gear system according to claim 1 wherein said planetary gear system further comprises a device group comprising a first friction device connected between said input means and one of said active elements of said first and second planetary gear set.

6. A planetary gear system comprising:
an input means for receiving an input rotation;
an output means for delivering an output rotation;
a first planetary gear train comprising first and second planetary gear sets, said first planetary gear train being connected with said input means;
a second planetary gear train comprising a third planetary gear set, said second planetary gear train being connected with said output means;
a first connecting means for connecting said first planetary gear train with said second planetary gear train;
a second connecting means for connecting said first planetary gear train with said second planetary gear train;
wherein each of said first, second and third planetary gear sets comprises three rotary active elements each of which functions as a unique one of a sun gear, ring gear and planet carrier, said first connecting means connecting one of said active elements of said first and second planetary gear sets with one of said third planetary gear set, said second connecting means connecting another of said active elements of said first and second planetary gear sets with another of said active elements of said third planetary gear set, and wherein said planetary gear system further comprises a third connecting means for connecting one of said active elements of said first planetary gear set with one of said active elements of said second planetary gear set, and a fourth connecting means for connecting another of said active elements of said first planetary gear set with another of said active elements of said second planetary gear set;
wherein said planetary gear system further comprises a device group comprising a first friction device connected between said input means and one of said active elements of said first and second planetary gear set; and
wherein said input means comprises an input shaft, said output means comprises an output shaft which is parallel to said input shaft, said first and second planetary gear sets are coaxial with said input shaft, and said third planetary gear set is coaxial with said output shaft.

7. A planetary gear system according to claim 6 wherein said first connecting means includes a first gearing means for connecting one rotary element coaxial with said input shaft with one rotary element coaxial with said output shaft by gearing, and said second connecting means includes a second gearing means for connecting one rotary element coaxial with said input shaft with one rotary element coaxial with said output shaft by gearing.

8. A planetary gear system according to claim 7 wherein said first and second gearing means are axially spaced from each other along an axial direction parallel to said input and output shafts.

9. A planetary gear system according to claim 6 wherein said first connecting means comprises a first input shaft's side gear coaxial with said input shaft and a first output shaft's side gear which is provided at one end of said output shaft and engaged with said first input shaft's side gear.

10. A planetary gear system according to claim 9 wherein each of said first and second planetary gear sets is of a single pinion type, and said third planetary gear set is of a double pinion type.

11. A planetary gear system according to claim 10 wherein said three active elements of said first planetary gear set are a first sun gear, a first ring gear and a first planet carrier which rotatably supports at least one first pinion directly meshing with both said first sun gear and said first ring gear, said three active elements of said second planetary gear set are a second sun gear, a second ring gear and a second planet carrier which rotatably supports at least one second pinion directly meshing with both said second sun gear and said second ring gear, and said three active elements of said third planetary gear set are a third sun gear, a third ring gear and a third planet carrier which rotatably supports at least one pinion pair consisting of a third inner pinion directly meshing with said third sun gear, and a third outer pinion directly meshing with both said third ring gear and said third inner pinion, said first ring gear and said second planet carrier being connected together by said third connecting means so that said first ring gear and said second planet carrier rotate as a unit, said first planet carrier and said second ring gear being connected together by said fourth connecting means so that said first planet carrier and said second ring gear rotate as a unit.

12. A planetary gear system according to claim 11 wherein said third sun gear and said first output shaft's side gear are connected with said output shaft so that said third sun gear, said first output shaft's side gear and said output shaft rotate as a unit, said first input shaft's side gear is connected with said first planet carrier so that said first input shaft's side gear and said first planet carrier rotate as a unit, said second connecting means connecting said first ring gear with said third ring gear by gearing.

13. A planetary gear system according to claim 12 wherein said device group comprises a first clutch disposed between said input shaft and said first sun gear, a second clutch disposed between said input shaft and said second planet carrier, a third clutch disposed between said input shaft and said second sun gear, a first brake for grounding said first ring gear, a second brake for grounding said third planet carrier, and a third brake for grounding said second sun gear.

14. A planetary gear system comprising:
an input means for receiving an input rotation;
an output means for delivering an output rotation;
a first planetary gear train comprising first and second planetary gear sets, said first planetary gear train being connected with said input means;
a second planetary gear train comprising a third planetary gear set, said second planetary gear train being connected with said output means;
a first connecting means for connecting said first planetary gear train with said second planetary gear train; and
a second connecting means for connecting said first planetary gear train with said second planetary gear train; wherein said first planetary gear set comprises a first sun gear, a first ring gear and a first planet carrier rotatably supporting a first pinion meshing with both said first sun gear and said first ring gear, said second planetary gear comprises a second sun gear, a second ring gear and a second planet carrier rotatably supporting a second pinion meshing with both said second sun gear and said second ring gear, and said third planetary gear set comprises a third sun gear, a third ring gear, and a third planet carrier rotatably supporting a third inner pinion meshing with said third sun gear and a third outer pinion meshing with both said third ring gear and said third inner pinion, and wherein said first ring gear is connected with said second planet carrier so that said first ring gear and said second planet carrier rotate as a unit, said first planet carrier is connected with said second ring gear so that said first planet carrier and said second ring gear rotate as a unit, said first connecting means connecting said first planet carrier with said third sun gear so that rotation can be transmitted therebetween, and said second connecting means connecting said first ring gear with said third ring gear so that rotation can be transmitted therebetween.

15. A planetary gear system according to claim 14 wherein said input means comprises an input shaft, said output means comprises an output shaft, each of said first and second planetary gear sets is coaxial with said input shaft, said third planetary gear set is coaxial with said output shaft, and said third sun gear is connected with said output shaft so that said third sun gear and said output shaft rotate as a unit.

16. A planetary gear system according to claim 15 wherein said input and output shafts are parallel to each other, said first connecting means comprises a first input shaft's side gear which is coaxial with said input shaft and connected with said first planet carrier so that said first input shaft's side gear and said first planet carrier rotate as a unit, and a first output shaft's side gear which is fixedly mounted on one end of said output shaft and which is engaged with said first input shaft's side gear, and said second connecting means comprises a second input shaft's side gear formed on a periphery of said first ring gear, and a second output shaft's side gear which is formed on a periphery of said third ring gear and which is engaged with said second input shaft's side gear.

17. A planetary gear system according to claim 16 wherein said planetary gear system further comprises a friction device group comprises a first clutch disposed between said input shaft and said first sun gear, a second clutch disposed between said input shaft and said second planet carrier, a third clutch disposed between said input shaft and said second sun gear, a first brake for grounding said first ring gear, a second brake for grounding said third planet carrier, and a third brake for grounding said second sun gear.

18. A planetary gear system according to claim 17 wherein said second planetary gear set is disposed between said input shaft and said first planetary gear set, and said first planetary gear set is disposed between said second planetary gear set and said first input shaft's side gear.

19. A planetary gear system according to claim 18 wherein said first, second and third clutches and said third brake are arranged coaxially with one another, and disposed between said input shaft an said second planetary gear set.

20. A planetary gear system according to claim 19 wherein said first brake is provided around said second planetary gear set.

21. A planetary gear system according to claim 15 wherein said input and output shafts are in alignment with each other, said first connecting means connects said first planet carrier with said third sun gear so that said first planet carrier and said third sun gear rotate as a unit, and said second connecting means connects said first ring gear with said third ring gear so that said first and third ring gears rotate as a unit.

* * * * *